Figure 1:
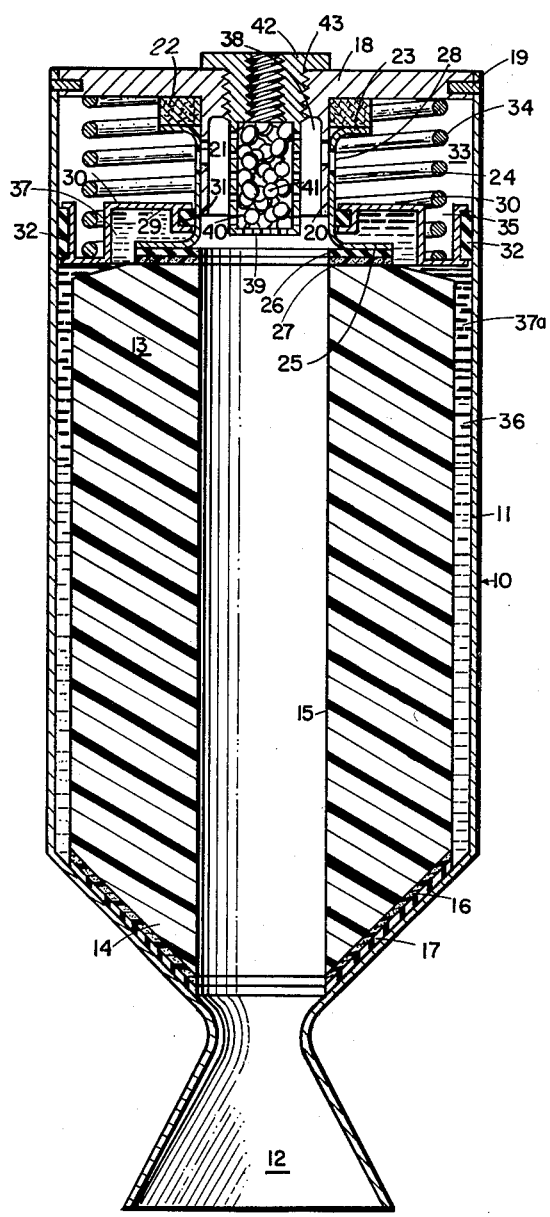

May 30, 1961 L. GREEN, JR 2,986,001
SHOCK ABSORBING MEANS FOR ROCKET PROPELLANT GRAINS
Filed Aug. 16, 1956

INVENTOR.
LEON GREEN JR.

BY
ATTORNEY

United States Patent Office 2,986,001
Patented May 30, 1961

2,986,001

SHOCK ABSORBING MEANS FOR ROCKET PROPELLANT GRAINS

Leon Green, Jr., West Covina, Calif., assignor to Aerojet-General Corporation, Azusa, Calif., a corporation of Ohio Filed Aug. 16, 1956, Ser. No. 605,684

8 Claims. (Cl. 60—35.6)

This invention relates to rocket motors of the type utilizing solid propellant, and has for an object to provide shock absorbing means for the propellant grains used in such motors.

Solid propellant type rocket motors commonly comprise a chamber containing a solid propellant grain and an exhaust nozzle from the chamber, so that when the grain burns, gaseous combustion products are evolved in large volume and at high pressure to eject a high velocity jet of gases out the exhaust nozzle. In the case of motors designed to employ an internal-burning, cartridge-loaded propellant grain, the externally-restricted propellant grain does not fit perfectly with the wall of the chamber, so that during operation the high pressures developed within the grain perforation tend to crack the propellant grain at any point or area not supported by the wall of the chamber. Such cracks are very disadvantageous in that they increase the burning area which unduly raises the pressure within the chamber.

In accordance with the present invention, I provide means for avoiding such fractures of the propellant grain. My invention is carried out by providing a filling of a liquid of special rheological characteristics in the region between the outside surface of the grain and the inside wall of the chamber. A feature of the construction resides in the provision of a surge chamber to take care of expansion or contractions of the propellant grain. The arrangement also acts as a shock absorber protecting the grain during the handling and operation of the motor.

The foregoing and other features of the invention will be better understood from the following description taken in connection with the accompanying drawings, of which the figure is a longitudinal section through a rocket motor embodying the invention.

Referring to the drawings, there is shown a rocket motor indicated at 10 comprising a generally cylindrical combustion chamber 11 and an exhaust nozzle 12 leading from the rear end of the chamber. Within the chamber there is placed a propellant grain 13 which is generally cylindrical in form with a central longitudinal opening therethrough and having an external diameter a little less than the internal diameter of the cylindrical chamber. The rear end 14 of the grain is shown beveled or frustoconical to conform with the general configuration of the chamber and nozzle. The grain, being of the internally burning type, is formed with a longitudinal opening 15 which may be of constant diameter or other form and coaxial with the axis of the nozzle. The form of the grain will hereinafter be designated as tubular. The material of the grain can be of any of those known in the art. Grain material is commonly a self-combustible substance containing its own fuel and oxidizer. An example of a propellant material which can be used is a mixture of organic resin and an oxidizer such as potassium perchlorate.

Near the aft end of the cylindrical chamber there is provided a liner 16 covering the beveled or frusto-conical portion of the grain. The liner is made of a material which may readily adhere to the propellant grain and is preferably of a thermoplastic nature to inhibit burning on the rear end of the grain. The liner is supported by a conical cushion 17 located coaxially with the axis of the grain so that the opening through the tube substantially lines up with the internal opening of the grain. The liner 16 has a similar opening so that the internal region 15 of the grain is in communication with the opening in the cushion 17.

The forward wall of the combustion chamber is closed by plate 18 which has a detachable pinned connection 19 with the combustion chamber to permit assembly of the various parts. The front closure plate has an integrally cast inwardly extending cylinder 20 extending a substantial distance into the forward part of the combustion chamber. The cylinder has spaced apertures 21 formed therein. A forward cushion 22 surrounds cylinder 20 abutting the closure plate 18 on one side and at the opposite side the forward flange 23 of a sleeve 24 abutting cylinder 20. Sleeve 24 has a rearward flange 25 engaging a circular gasket 26. On the forward end of the propellant grain is a liner 27 similar in composition to the aft liner 16. The liner adheres to the propellant grain surface and to the gasket in a manner to inhibit burning on the forward end of the grain. The sleeve, gasket and liner all have an inner formed edge lining up with the opening 15 in the propellant grain. The sleeve 24 has apertures 28 formed therein which coincide to a certain extent with the before-mentioned apertures 21 in cylinder 20. A slight compressive load, sufficient to insure contact of the assembled parts, is applied when assembling the motor.

A centrally apertured diaphragm 29 is arranged to slidably abut at its inner periphery on the sleeve member 24. This diaphragm comprises a disc-like portion 30 extending generally from the sleeve to the inner cylindrical wall of the chamber, and to prevent dilatant fluid leakage, is provided with seals 31 and 32 fitted into suitable grooves around the inner and outer edges of the diaphragm. The region between the forward wall of the chamber and the diaphragm 29 forms a chamber 33 within which there is placed a helical compression spring 34 which bears at its forward end against the plate 18 and at its rear end is seated in an annular groove 35 formed in the diaphragm.

The annular space 36 between the cylindrical chamber wall 11 and the outer wall of the propellant grain is in communication with the space 37, which is immediately to the rear of the diaphragm; and this space is filled with a dilatant liquid 37a, whose apparent viscosity increases with increasing rate of strain and decreases to normal at low rates of deformation, so that at relatively high strain rates, it behaves as an elastic solid. An example of dilatant liquid is silicone putty. The term "dilatant liquid" will be used to indicate materials having the characteristics required for use in this invention.

Within the space 38 within the cylinder 20 there is placed an igniter 39. This igniter may be of a well known type, such as for example that disclosed and claimed in application Serial No. 306,030, filed August 23, 1952, assigned to the same assignee as the present invention. Such an igniter comprises a perforated cage 40 containing pellets 41 of a self-combustible substance, the cage being fastened to a suitable base or plug 42 shown threaded at 43 through the forward wall or plate 18 of the chamber. The igniter will ordinarily contain a suitable igniting squib (not shown) which may be caused to ignite a readily combustible substance such as black powder (not shown), which in turn will ignite the pellets. Since the details of the construction of the igniter constitute no part of the present invention, no further details need be given here.

In the assembly of the grain within the chamber, the compression spring 34 is placed under compression so that the diaphragm 29 is always acting to compress the viscous liquid 37a in regions 36, 37.

In the operation of the device, the igniter will be ignited, causing its flame to extend out into the internal region of the propellant grain, which will cause burning over this internal cylindrical grain surface. The presence of the sealing means 16 and 27 at the aft and forward ends of the grain will serve to prevent burning on these sealed grained surfaces, and also to prevent combustion from reaching the exterior surface of the grain. The presence of the compressed dilatant liquid 37a may serve to prevent burning on the exterior surfaces. Alternatively, the outer periphery of the grain may be suitably restricted against burning in the manner of the fore and aft ends.

At the initiation of the burning of the grain, the pressure of the gases by sealing means on the outer surface of the grain of combustion rises very rapidly in space 15 of the grain. Such internal pressure, even though existing for only a short duration, has produced fractures of the grain in known forms of solid propellant rocket motors. In view of the presence of the compressed dilatant liquid, and the incompressibility of the grain, this internal pressure is absorbed by the liquid and tends to force the additional liquid into chamber 37 under the diaphragm 29 and causes the diaphragm to move forwardly against the resistance of the spring 34. The apparent viscosity of the liquid will be very high at the initial surge of pressure, but when the pressure peak is reached, the liquid will "relax"; that is, its apparent viscosity will drop so that it will again behave more as a liquid. This action of the liquid, during the brief time in which pressure equilibrium is being established between the internal and exterior surfaces of the grain, is sufficient to protect the grain against excessive strains which could cause fractures. By the time relaxation in the liquid has taken place, pressure equilibrium will have been established by flow through orifices 21 and 28.

It will be recognized that by my invention I have provided an effective arrangement for protecting a solid propellant grain against shocks to which it may be subjected in the handling and igniting of it, and particularly from the sudden shocks from the high internal pressures developed upon ignition as well as the further advantage of furnishing restriction preventing burning on the outer surface of the grain.

It will be apparent to those skilled in the art that other modifications and arrangements may be made within the scope of this invention; the scope of which is not limited by the illustrative embodiment disclosed herein but only by the scope of the appended claims.

I claim:

1. A rocket motor of the solid propellant type, comprising: a combustion chamber and exhaust nozzle; a solid grain propellant within the chamber leaving an annular space between the grain and the chamber wall; a layer of dilatant liquid in said annular space for absorbing the shock of grain ignition; an igniter in the forward end of the combustion chamber; and a yieldable diaphragm around said igniter, the dilatant liquid also filling the space between the forward end of the grain and said diaphragm, the diaphragm absorbing expansion of said dilatant liquid.

2. A rocket motor of the solid propellant type, comprising: a combustion chamber and exhaust nozzle; a solid grain propellant within but spaced from the wall of said chamber; a layer of dilatant liquid filling the space between the grain propellant and the wall of the chamber and extending over the forward end of the grain; a yieldable diaphragm separating the dilatant liquid in contact with the forward end of the grain from the forward end of the combustion chamber; and a surge chamber located between the lower surface of the diaphragm and the forward end of the grain, said surge chamber also containing the dilatant liquid.

3. A rocket motor of the solid propellant type, comprising: a combustion chamber and an exhaust nozzle; a solid grain propellant within the chamber leaving an annular space between the grain and the wall of the chamber; a layer of dilatant liquid in said annular space; a cylindrical wall projecting into said chamber from the forward end thereof adapted to surround an igniter; a sleeve having a rearward flange supported against the forward end of the propellant grain, and an outer flange supported against the forward end of the combustion chamber, and supported intermediate said flanges by the said cylindrical wall; a centrally apertured diaphragm having its inner edge slidable against the inner surface of said sleeve and its outer edge slidable against the inner surface of said chamber; and resilient means mounted between the forward end of said chamber and said diaphragm and effective to cause the diaphragm to yieldably exert pressure against the forward end of the layer of dilatant liquid.

4. A rocket motor as set forth in claim 3 and in which said diaphragm is formed with inwardly projecting inner and outer edges affording between them and the lower surface of the diaphragm a surge chamber for the dilatant liquid, said inwardly projecting portions guiding the diaphragm for movement on the surface of the sleeve and chamber wall.

5. A rocket motor as set forth in claim 4 and in addition comprising sealing rings seated in grooves provided in said inwardly projecting portions of the diaphragm.

6. A rocket motor of the solid propellant type, comprising: a combustion chamber and exhaust nozzle; a solid grain propellant within but spaced from the wall of said chamber; a layer of dilatant liquid filling the space between the grain propellant and the wall of the chamber and extending over the forward end of the grain; a yieldable diaphragm separating the dilatant liquid in contact with the forward end of the grain from the forward end of the combustion chamber; and a surge chamber located between the lower surface of the diaphragm and the forward end of the grain, said surge chamber also containing the dilatant liquid; and a liner on the forward and nozzle end of said grain to prevent surface burning of said grain at those areas, the dilatant liquid in contact with the grain intermediate said areas being also effective to prevent surface burning of the grain on the areas contacted by it.

7. A rocket motor of the solid propellant type, comprising: a combustion chamber and an exhaust nozzle; a solid grain propellant within the chamber leaving an annular space between the grain and the wall of the chamber; a layer of dilatant liquid in said annular space; a cylindrical wall projecting into said chamber from the forward end thereof adapted to surround an igniter; a sleeve having a rearward flange supported against the forward end of the propellant grain, and an outer flange supported against the forward end of the combustion chamber, and supported intermediate said flanges by the said cylindrical wall, communicating openings being provided in said wall and sleeve; cushioning means between the outer flange of said sleeve and the forward end of said chamber; a centrally apertured diaphragm having its inner edge slidable against the inner surface of said sleeve and its outer edge slidable against the inner surface of said chamber; and resilient means mounted between the forward end of said chamber and said diaphragm and effective to cause the diaphragm to yieldably exert pressure against the forward end of the layer of dilatant liquid.

8. A solid propellant rocket motor which comprises a combustion chamber and exhaust nozzle; a solid propellant grain within said chamber and spaced apart from the walls of said chamber, a body of liquid filling the space between said grain and said wall and extending over the forward end of said grain; diaphragm means separating said liquid from the forward end of said chamber; a surge chamber containing fluid positioned between the after surface of said diaphragm and the forward end of said grain; and ignition means within said chamber for igniting said propellant grain.

References Cited in the file of this patent

UNITED STATES PATENTS

| | | |
|---|---|---|
| 2,522,113 | Goddard | Sept. 12, 1950 |
| 2,703,478 | Grimes et al. | Mar. 8, 1955 |
| 2,748,702 | Sawyer | June 5, 1956 |

FOREIGN PATENTS

| | | |
|---|---|---|
| 570,211 | Great Britain | June 27, 1945 |

OTHER REFERENCES

Textbook: "Flow Properties of Disperse Systems" by J. J. Hermans, 1953, published by Interscience Publishers, Inc., N.Y., and North-Holland Publishing Co., Amsterdam.